United States Patent [19]

Janke et al.

[11] Patent Number: 4,897,777
[45] Date of Patent: Jan. 30, 1990

[54] PEER-TO-PEER REGISTER EXCHANGE CONTROLLER FOR PLCS

[75] Inventors: Donald R. Janke; Kim J. Watt, both of Milwaukee, Wis.; Dirk I. Gates, Woodland Hills, Calif.

[73] Assignee: Square D Company, Palatine, Ill.

[21] Appl. No.: 179,674

[22] Filed: Apr. 11, 1988

[51] Int. Cl.[4] .................... G06F 15/46; G06F 15/16
[52] U.S. Cl. .................................... 364/134; 364/140; 364/900; 364/926.9; 364/949; 364/931.4; 364/942.1; 364/951
[58] Field of Search ............................. 364/131–136, 364/140–147, 200 MS File, 900 MS File

[56] References Cited

U.S. PATENT DOCUMENTS

| | | | |
|---|---|---|---|
| 4,253,148 | 2/1981 | Johnson et al. | 364/200 |
| 4,304,001 | 12/1981 | Cope | 364/138 X |
| 4,459,655 | 7/1984 | Willemin | 364/132 |
| 4,486,856 | 12/1984 | Heckel et al. | 364/900 |
| 4,550,366 | 10/1985 | Toyama et al. | 364/134 X |
| 4,607,256 | 8/1986 | Henzel | 364/133 X |
| 4,608,661 | 8/1986 | Sasaki | 364/900 |
| 4,718,039 | 1/1988 | Aichelmann, Jr. et al. | 364/900 |
| 4,754,427 | 6/1988 | Okayama | 364/132 X |

*Primary Examiner*—Joseph Ruggiero
*Attorney, Agent, or Firm*—Michael J. Femal; Thomas K. Stine

[57] ABSTRACT

A communication network for programmable logic controllers (PLCs) wherein selected memory means of each PLC have at least two ports directly accessible by other PLCs and certain registers of the PLCs are identical to enable efficient, high-speed transfer of blocks of data between the PLCs.

13 Claims, 2 Drawing Sheets

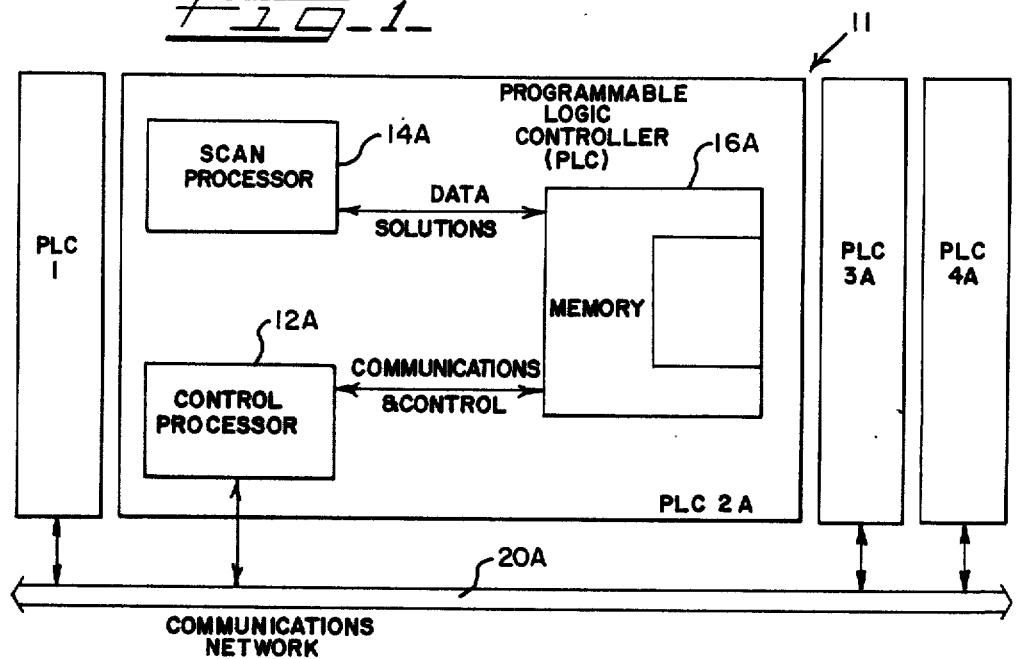
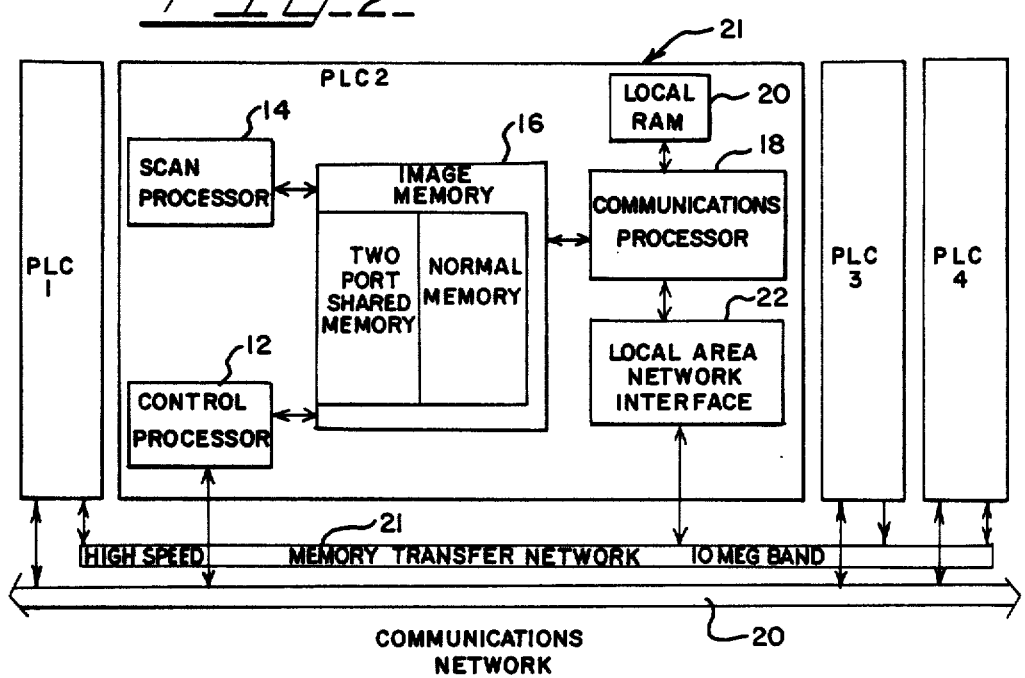

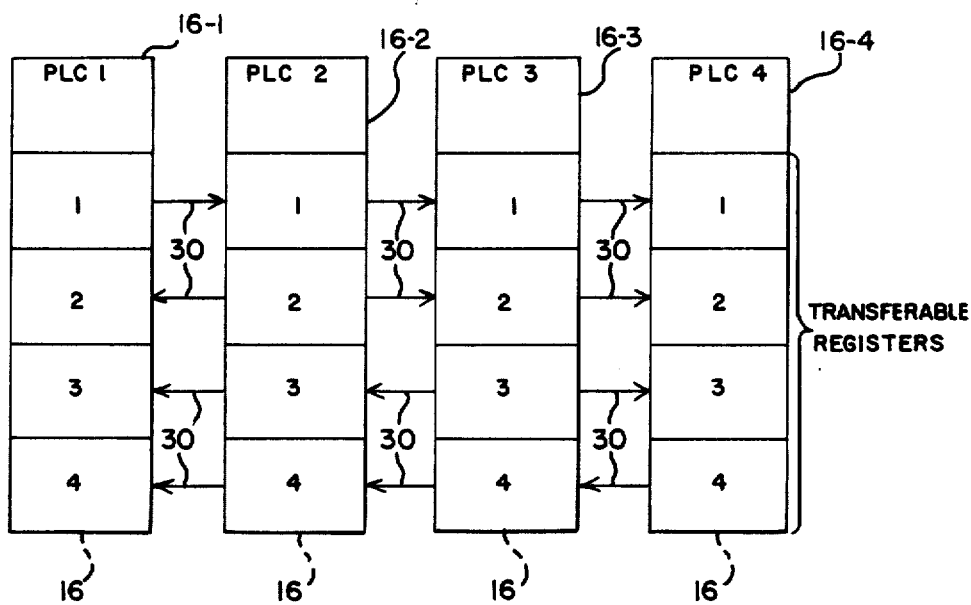
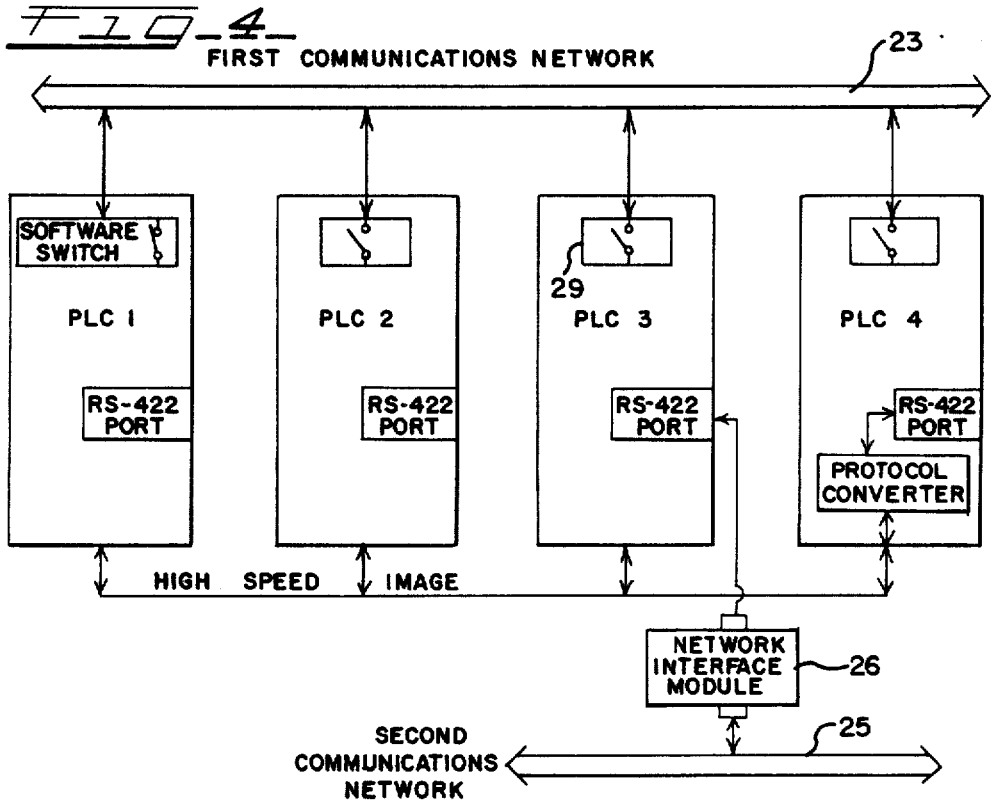

PEER-TO-PEER REGISTER EXCHANGE CONTROLLER FOR PLCS

DESCRIPTION

1. Reference to Related Applications

This application is related to applications filed concurrently herewith, entitled "Network Communications System", Ser. No. 179,969; "Ladder Sequence Controller" Ser. No. 180,093; High-Speed Press Control System" Ser. No. 179,743; and, "Network Interface Board System", Ser. No. 179,756. The contents of these applications are incorporated herein by reference.

2. Technical Field

This invention relates generally to interconnecting programmable logic controllers connected together to effect sequential program instructions and particularly relates to interconnecting image memory portions of several programmable logic controllers to enable operation at a speed much greater than the operating speed of the programmable logic controllers functioning independently.

3. Background of the Invention

In the past, programmable logic controllers have received sensor information over a communications network or over discrete leads from the machine tool being controlled. The programmable logic controller or PLC processes the sensor information according to sequential instructions contained in its program memory portion. The result of the processing of the sensor information often results in command information that the PLC transmits to switches or actuators on the controlled machine tool over the communications network or on discrete leads.

PLCs normally include an image memory which contains registers and addresses assigned to reflect the condition of the various sensors monitoring the machine tool. Information from the sensors and received at the PLC becomes stored at certain registers and the processing instructions in the PLC operate on the information contained in the image memory. Some PLCs include two processors to obtain increased operating speed: one is a control processor that handles communications with the sensors and drivers to move information to and from the image memory and that assigns tasks to the second processor; and the second is a SCAN processor that effects the sequential processing instructions to obtain information from the image memory and provide solutions to other certain addresses in the image memory under control of the control processor.

While this latter arrangement has obtained higher processing speeds, further speed increases are desired.

SUMMARY OF THE INVENTION

The invention provides a high-speed interconnection between the image memory portions of several PLCs operating together. This allows each PLC to operate on a portion of a sequential instruction set and for the solution obtained by each PLC to appear in the image memory portions of the other PLCs at a time that is effectively simultaneous with the solution.

Moreover, the high-speed image memory transfers between the PLCs occur with parity and CRC checking at each PLC before the information is written into the image memory of that PLC to verify the accuracy of the information transfer between the image memories. The foregoing not only obtains increased operating speed but guarantees the accuracy of the information transferred between image memory portions of the PLCs.

Other advantages and aspects of the invention will become apparent upon making reference to the specification, claims, and drawings to follow.

DESCRIPTION OF THE DRAWINGS

FIG. 1 is a block diagram of four programmable logic controllers (PLCs) connecting to a communications network;

FIG. 2 is a block diagram of a modification of the diagram of FIG. 1 which includes a high-speed memory transfer network in accordance with the invention;

FIG. 3 is a block diagram showing transferable register of each of the four PLCs and indicating transfer of blocks between the registers by the arrowed lines; and, FIG. 4 shows the manner of connection between two communication networks.

DETAILED DESCRIPTION OF THE INVENTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to embodiment illustrated.

FIG. 1 shows a presently used communications network including a group of 4 programmable logic controllers (PLCs) numbered 1 to 4A. Each of the PLCs include a control processor 12, a scan processor 14A and an image memory 16A. As noted in FIG. 1, the memory 16A is accessed by the control processor 12A to obtain or provide communications and control data. The scan processor 14A in turn accesses the image memory 16A and then through the control processor 12A to the communications network 20A.

FIG. 2 shows a communications network 21 of the invention including four programmable logic controllers (PLCs) 1 to 4, although up to 16 PLC's can be used. Each of the PLCs includes a control processor 12, a scan processor 14, and a memory 16. Referring to FIG. 2, the memory 16, for a device with peer-to-peer communications, is further divided into three sections, the normal memory, image memory and the two port shared memory. It is this shared memory and its operation that allow these programmable logic controllers to operate in a peer-to-peer (slave-to-slave) fashion. Importantly, each of the PLCs further include a communications processor 18, a local RAM (Random Access Memory) 20 and a local area network interface 22. The local area network interface 22 connects to high speed image memory transfer network 21.

As mentioned above, and as will be explained in detail hereinbelow, the image memories 16 of each of the PLCs 1 to 4 are interconnected and are, in effect, commonly accessed by the network devices and by the other PLCs to provide a higher speed of network communication and transfer of data.

Refer now to FIG. 3 which shows the image memory 16 map 16-1, 16-2, 16-3 and 16-4 of each of the PLCs 1 to 4. The memory maps of the PLCs are similar and each consists of 2 to 16 blocks. For simplicity of explanation, the transferable memory of each PLC represented in FIG. 3 will be divided with 4 blocks. As each block of registers has an assigned time slot when it transfers blocks of registers, each device sends a different block of registers. This is shown in FIG. 3 wherein the arrowed line generally marked as 30 indicates the transfer of block register 1 of PLC 1 to PLC 2, PLC 3 and PLC 4. PLC 3 transfers the block register 3 to PLC 1, PLC 2 and PLC 4, and PLC 4 transfers the block of registers 4 to PLC 1, PLC 2 and PLC 3.

FIG. 4 shows circuitry for coupling from a first communications network 23 to a second communications network 25. This is accomplished through a dual port network interface module 26 as explained in co-pending U.S. patent application Ser. No. 179,756 entitled "Network Interface Board System". As clearly shown in FIG. 4, communications network 25 communicates through a network interface module 26 with RS-422 port in PLC 3 and a software switch 29 to communications network 23. This type of connection may be made necessary when the first network 23 is supporting or has connected to it its maximum load of 100 network interface modules 26 and 200 devices (machines to be controlled, printers, terminals, computers, etc.).

The peer-to-peer network is able to transfer blocks of registers between 2 to 16 devices, each device sending a different block of registers. Each block of registers is assigned a mailbox location. The location of the mailbox is dependent on the ID number that each device is assigned.

When first powered up, when a device is added or removed from the network or in the event of noise, the network will need to be reformed.

In the formation process, each device sends a loop formation packet onto the network. The packet is identified as a loop formation packet, and contains information on the address of the sender, and size of blocks. During loop formation, the following is set up. The number of units on the network is determined, verification is made that all units have the same block size, each unit tests its address against the address of the other devices, and time slices for each device on the network are defined, that is, each device on the network calculates during what time slice it is to transmit, and what block it should be receiving during any given time slice. Each device sends a packet when it detects that the network is free. In the event there is a collision, the colliding units back off, and after a random delay, they resend their packets.

After a formation packet is sent, the sending device delays the time necessary to receive and process one packet. If a packet is received, it will again delay the time necessary to receive and process a packet. This will continue until no more packets are received. This means that all units will have time to send their packets to all other devices. After the last packet has been received, and the last time out, normal loop operation commences.

During the first loop, the transmitter waits one packet time before sending the first packet. The receivers will wait three packet times before timing out.

As mentioned above, loop formation is a function of the block size, and the number of units on the network. In general, formation time is determined by the following equation:

"*Formation Time* = $K$ + *Block Size* (*Number of Devices on the Network*)"

Each device on the network sends its packet during the time slice defined during loop formation. The transmitted data is direct memory accessed out of the shared register RAM allowing the communication processor to handle necessary processing tasks such as updating the overall communication status bits.

When not transmitting data, each device waits for a packet from another device. When a packet is received, its CRC is validated, and a check is made if the sender of the packet is in the correct time slice. If the packet is totally validated, it is moved to the shared RAM.

If, during normal operation, a loop formation packet is received, the device will drop out of normal operation and go to loop formation mode.

The update time for a given installation can be determined by multiplying the block time for a single update by the actual number of units on the network.

The communication update rate is a function of the actual number of units on the network and the block size.

Ladder scans of some or all of the processors on the network can be automatically synchronized. This allows the processors to scan at the same time and facilitates parallel processing.

The serial network interface receives and transmits data over the peer-to-peer network. The data is sent in block form with CRC protection and parity protection on each block. The transmission method does not use collision detection schemes and is completely deterministic in the time domain. The serial network interface uses the shared register area (two port) as storage or the location to get messages.

The communication processor takes care of all processing required by the peer-to-peer network. It has access to the serial network interface and two port memory. It also has inputs to the setup switches. The communication processor sets up the network protocols and reports network status to the user through the two port memory.

The communication processor does most communication with the control processor through the two port memory.

Each PLC device has a bank of switches for setup. The state of the switches is read once at power up by the communication processor.

One switch is a rotary switch to set up the identification number of the device from O to F. Every device connected to the peer-to-peer network must have a unique identification number or the network will not operate properly. Labeling on the front panel allows the user to indicate the device ID number.

The other switches are arranged as follows:

1. (Bit 1-2) This code indicates the maximum number of units in the network. For fastest network formation time, the smallest possible number should be selected. All devices on the network must have the same code set up or the network will not operate properly. The code is as follows:

| Code | Max. Number of Units on the Network |
|------|-------------------------------------|
| 0    | 2                                   |
| 1    | 4                                   |
| 2    | 8                                   |
| 3    | 16                                  |

2. (Bit 3-4) This code indicates the block size. The block size is the number of registers sent from a device on the network to all other devices on the network. All devices on the network must have the same code or the network will not operate properly. The code is as follows:

| Code | Size of Block (Registers) |
|---|---|
| 0 | 32 |
| 1 | 64 |
| 2 | 128 |
| 3 | AUTO |

The AUTO position automatically configures the maximum number of registers possible based on the setting of the Maximum Number of Units on the Network switch. The following table describes this relationship:

| Max. Number of Units On The Network | Number of AUTO Register |
|---|---|
| 2 | 512 |
| 4 | 256 |
| 8 | 128 |
| 16 | 64 |

The 1024 "shared data registers" can be arranged in any one of 4 different block size configurations. They are: 2 blocks of 512 registers, 4 blocks of 256 registers, 8 blocks of 128 registers or 16 blocks of 64 registers.

In addition to the above shared registers, the PLC device has a "peer-to-peer control register" at location 8096. This register will allow the user to configure the shared registers for the particular application. The bits in this register are dynamic in that they can be changed by the user program at any time.

Table 1 contains a map of the shared registers which are divided into 5 main sections. There are: 8 control data registers, 5 spare registers, 3 miscellaneous registers, 16 communications status registers, and 1024 data registers. An explanation of the register follows:

TABLE 1

| | | SHARED REGISTERS MEMORY MAP | |
|---|---|---|---|
| Control | 8000 | Error Code | |
| Date Write | 7999 | DIP Switch Image | |
| Protected | 7998 | Device ID | |
| (8) | 7997 | Block Size | |
| | 7996 | Number of Blocks | |
| | 7995 | Comm to CPU Handshake | |
| | 7994 | Main-CPU Handshake | |
| | 7993 | Reflectometry Counter | |
| Share | 7992 | Spare | |
| (5) | 7991 | Spare | |
| | 7990 | Spare | |
| | 7989 | Spare | |
| | 7988 | Spare | |
| Misc | 7987 | Count of Loop Formations | |
| (3) | 7986 | Max Consecutive Block Errors | |
| | 7985 | Failure Override Control | |
| | 7984 | PLC Device | 0 |
| | 7983 | | 1 |
| | 7982 | | 2 |
| | 7981 | | 3 |
| | 7980 | | 4 |
| Communi- | 7979 | | 5 |
| cation | 7978 | | 6 |
| Status | 7977 | | 7 |
| Registers | 7976 | | 8 |
| (16) | 7975 | | 9 |
| | 7974 | | 10 |
| | 7973 | | 11 |
| | 7972 | | 12 |
| | 7971 | | 13 |
| | 7970 | | 14 |
| | 7969 | | 15 |
| Data | 7968 | Shared Data | |

TABLE 1-continued

| | | SHARED REGISTERS MEMORY MAP | |
|---|---|---|---|
| Registers | 7968 | Shared Data | |
| (1024) | 7968 | Shared Data | |
| | 6945 | Shared Data | |

Error Code (8000)

If the communication processor detects an error, it will post an error code in this register.

The following error codes are supported:

| | Code | Meaning |
|---|---|---|
| A | 0 | No error |
| B | 1 | Address Error |
| C | 2 | Bus Error |
| D | 3 | Parity Error |
| E | 4 | Handshake Failure |
| F | 5 | Main Processor Failure |
| G | 6 | PROM Checksum Test Failure |
| H | 7 | Local RAM Read AFter Write Test Failure |
| I | 8 | Local RAM Destructive Test Failure |
| J | 9 | Shared RAM Read After Write Test Failure |
| K | 10 | Shared RAM Destructive Test Failure |
| L | 11 | Local Area Network Controller Test Failure |
| M | 12 | Shared Register Block Exceeds 1024 Registers |
| N | 13 | Incorrect Block Size Received |
| O | 14 | Address greater than Number of Devices on the Network |
| P | 15 | Duplicate Address Detected |
| Q | 16 | Block Error Limit Exceeded |

The Dip Switch Image (7999) register contains an image of the peer-to-peer dip switch. The user can read this register to find out how the dip switch is set without removing the device from the rack. The communication processor writes the data to this location.

The Device ID (7998) register contains the ID code assigned to this unit. The communication processor decodes the ID code from the dip switch settings and places it here.

The Block Size (7997) register contains the peer-to-peer block size. The communication processor decodes the block size from the dip switch settings and places it here.

The Number of Blocks (7996) register contains the maximum number of blocks transferred by the peer-to-peer network. The communication processor decodes the maximum number of blocks from the dip switch setting and places it here.

The Comms to CPU Handshake (7995) is an internal register used by communication processor to handshake with the control processor.

The Main CPU Handshake (7994) is an internal register used by control processor to handshake with the communication processor.

The Time Domain Reflectometry Counter (7993) counts proportional to the length of the cable. A counter is started when a transmission is started from a unit. Reflections from the cable end terminate the count. The value should be constant for a given installation and device on the network. It has value as a trouble shooting tool.

Spare Registers for Future Expansion (7992-7988) are registers reserved for future expansion.

During power up and conditions of extraordinary network disturbances, the network may be automatically reformed. The Count of Loop Formations (7987) register contains a count of the number of times the network has been reformed.

The Maximum Consecutive Block Errors (7986) register is programmed by the user to indicate the maximum number of consecutive block errors before the system automatically generates an error and goes to HALT.

When the bits in the Failure Override Control (7985) registers are zero, the PLC will generate an error if the communication processor detects (n) consecutive errors in a row where (n) is determined by the contents of the previous maximum consecutive block errors. If a bit is set to one, the error will not be generated. Bit 1 corresponds to PLC device 1, Bit 2 to PLC device 2 and so on, up to PLC device 15.

The Communication Status Registers (CSR) (7984–7969) are written to by the communication processor to give the status of individual communication channels. There is one register for each communications register.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

We claim:

1. A peer-to-peer communications network for high speed transfer of data between devices comprising in combination:

a communications network;

at least two programmable logic controllers (PLC's) connected to communicate with said network, each of said PLC's including a control processor for sequentially performing a series of instructions, a multi-port image memory coupled between said control processor and said communications network and having a plurality of blocks, a first one of said plurality of blocks corresponding to its respective one of said PLC's, the other of said plurality of blocks corresponding to respective ones of the others of said PLS's, an input/output device, means for storing status data representing a status of said input/output device in said first one of said blocks; and means for transferring said input/output status from each of said first ones of said blocks of said respective multi-port image memories to said respective blocks of said other of said multi-port image memories of said other PLC's independent of operation of said control processors.

2. The peer-to-peer communications network of claim 1, wherein each of said multi-port memories comprise registers containing transferable data which is transferable between the others of said multi-port memories.

3. The peer-to-peer communications network of claim 2, wherein each of said blocks includes a plurality of registers and the size of the registers containing data being transferred from one of said multi-port memories to the other of said multi-port memories matches the size of said registers to which they are being transferred.

4. The peer-to-peer communications network of claim 3, wherein each of said registers has an address including a first PLC ID number and a second, mailbox number, and the mailbox numbers of the blocks of registers are identical.

5. The peer-to-peer communications network of claim 1, wherein each of said PLC's includes a dedicated communications processor to coordinate the transfer of data between the respective blocks.

6. The peer-to-peer communications network of claim 1, including between 2 to 16 PLC'.

7. The peer-to-peer communications network of claim 1 wherein each of said plurality of control processors can be selectively connected to a common communication bus.

8. A peer-to-peer communications network for high speed transfer of data comprising:

a communications network;

a first programmable logic controller (PLC) communicatively coupled to said network, said first PLC including a first control processor for sequentially performing a series of instructions, a first input/output device, a first multi-port image memory coupled between said first control processor and said communications network and having a plurality of first memory blocks, a first one of said first memory blocks corresponding to said first PLC, and means for storing status data representing a status of said first input/output device in said first one of said first memory blocks;

a second programmable logic controller (PLC) communicatively coupled to said network, said second PLC including a second control processor for sequentially performing a series of instructions, a second input/output device, a second multi-port image memory coupled between said second control processor and said communications network and having a plurality of second memory blocks, a second one of said second memory blocks corresponding to said second PLC, means for storing status data representing a status of said second input/output device in said first one of said second memory blocks; and means for transferring said data in said first one of said first memory blocks into said first one of said second memory blocks and for transferring said data in said second one of said second memory blocks into said second one of said first memory blocks independent of operation of said control processors.

9. The peer-to-peer communications network of claim 8, wherein each of said first and second memory blocks includes a plurality of registers, and the size of the registers containing data being transferred from one of said multi-port memories to the other of said multi-port memories matches the size of said registers to which they are being transferred.

10. The peer-to-peer communications network of claim 8 wherein each of said registers has an address including a first, PLC ID number and a second, mailbox number, and the mailbox numbers of the blocks of registers are identical.

11. The peer-to-peer communications network of claim 8, wherein each of said first and second PLC's includes a dedicated communications processor to coordinate the transfer of data between the respective blocks.

12. The peer-to-peer communications network of claim 8, including between 2 to 16 PLC's.

13. The peer-to-peer communications network of claim 8 wherein each of said first and second control processors can be selectively connected to a common communication bus.

* * * * *